(12) United States Patent
Tang et al.

(10) Patent No.: US 9,723,256 B2
(45) Date of Patent: **\*Aug. 1, 2017**

(54) SYSTEMS AND METHODS FOR RE-RECORDING CONTENT ASSOCIATED WITH RE-EMERGED POPULARITY

(71) Applicant: Rovi Guides, Inc., Santa Clara, CA (US)

(72) Inventors: Young A. Tang, Burbank, CA (US); William L. Thomas, Evergreen, CO (US); Michael R. Nichols, La Canada Flintridge, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,779

(22) Filed: Feb. 4, 2016

(65) Prior Publication Data

US 2016/0165175 A1 Jun. 9, 2016

Related U.S. Application Data

(63) Continuation of application No. 14/224,856, filed on Mar. 25, 2014, now Pat. No. 9,288,431.

(51) Int. Cl.
*H04N 5/76* (2006.01)
*G11B 27/00* (2006.01)
(Continued)

(52) U.S. Cl.
CPC ............ *H04N 5/91* (2013.01); *H04N 5/76* (2013.01); *H04N 5/85* (2013.01); *H04N 21/23113* (2013.01); *H04N 21/25891* (2013.01); *H04N 21/2747* (2013.01); *H04N 21/4334* (2013.01); *H04N 21/4335* (2013.01); *H04N 21/4532* (2013.01); *H04N 21/4821* (2013.01)

(58) Field of Classification Search
CPC ... H04N 5/76; H04N 5/93; H04N 9/80; G11B 27/00
USPC ....... 386/291, 293, 295, 297, 299, 278, 288, 386/239
See application file for complete search history.

(56) References Cited

U.S. PATENT DOCUMENTS

| 8,544,037 B2* | 9/2013 | Terada | G11B 27/034 348/559 |
| 9,288,431 B2* | 3/2016 | Tang | H04N 5/85 |

(Continued)

*Primary Examiner* — Daquan Zhao
(74) *Attorney, Agent, or Firm* — Ropes & Gray LLP

(57) ABSTRACT

Systems and methods for re-recording content associated with popularity that re-emerged are provided. A plurality of media assets is recorded. Responsive to determining that popularity of a given one of the plurality of media assets fell below a first threshold, the given media asset is selected for deletion and the given media asset is added to a list of a plurality of media assets that have been selected for deletion. Popularity for the given media asset in the list is retrieved after selecting the given media asset for deletion. The retrieved popularity of the given media asset, which previously fell below the first threshold, is compared to a second threshold. In response to determining that the retrieved popularity of the given media asset, which previously fell below the first threshold, is now above the second threshold, an action relating to re-recording the given media asset is performed.

20 Claims, 5 Drawing Sheets

(51) Int. Cl.
*H04N 5/91* (2006.01)
*H04N 5/85* (2006.01)
*H04N 21/231* (2011.01)
*H04N 21/2747* (2011.01)
*H04N 21/433* (2011.01)
*H04N 21/4335* (2011.01)
*H04N 21/482* (2011.01)
*H04N 21/258* (2011.01)
*H04N 21/45* (2011.01)
*H04N 5/93* (2006.01)
*H04N 9/80* (2006.01)

(56) References Cited

U.S. PATENT DOCUMENTS

2009/0060468 A1\* 3/2009 Carlberg ............ H04N 7/17318
  386/297
2009/0100478 A1\* 4/2009 Craner .................. G11B 19/00
  725/87
2014/0149533 A1\* 5/2014 Bergman ............ H04L 67/1097
  709/213

\* cited by examiner

Previously Deleted Programs Due to Unpopularity

| Title — 510 | Current Popularity — 520 | First Threshold — 530 | Second Threshold — 540 |
|---|---|---|---|
| Seinfeld, Episode 2, Season 2 | 76% | 80% | 87% [Set] — 542 |
| Friends, Episode 5, Season 6 | 90% | 91% | 98% [Set] |
| Family Guy | 88% | 80% | 86% [Set] |
| ... | ... | ... | ... |

SYSTEMS AND METHODS FOR RE-RECORDING CONTENT ASSOCIATED WITH RE-EMERGED POPULARITY

CROSS-REFERENCE TO RELATED APPLICATION

This application is a continuation of U.S. patent application Ser. No. 14/224,856, filed Mar. 25, 2014, currently pending, which is hereby incorporated by reference herein in its entirety.

BACKGROUND

Traditional systems discard recorded content that is unpopular. These systems, however, fail to take into account the fact that unpopular content sometimes becomes popular again in the future. Accordingly, these systems make it difficult for a user to identify such content that was once unpopular and is now popular.

SUMMARY

In view of the foregoing, systems and methods for re-recording content associated with re-emerged popularity are provided. Specifically, the systems and methods perform an action relating to re-recording content that has previously been selected for deletion due to a dropping popularity and which is now associated with a popularity that exceeds a threshold.

In some embodiments, a plurality of media assets may be recorded. The media assets may be recorded automatically (e.g., because popularity exceeds a given threshold) and/or may be recorded as a result of manual user selection to record the media assets. A popularity of a given one of the media assets may be retrieved from storage circuitry (e.g., from a local or remote database). The popularity of the given media asset may be determined based on at least one of posts to an online database, a profile associated with the user, status updates of users on a remote server, microblog entries, industry ratings metrics, number pay-per-view purchases, number of tickets sold in a movie theater, demographic information, psychographic information, rental patterns, regional preferences, and user-to-user recommendations. A first threshold value that is associated with the given media asset may be retrieved from storage circuitry (e.g., from a local or remote database).

In some embodiments, the popularity of the given media asset is compared with the first threshold. Responsive to determining that popularity of a given one of the plurality of media assets fell below the first threshold (e.g., the popularity is less than or equal to the first threshold), the given media asset may be selected for deletion and added to a list of a plurality of media assets that have been selected for deletion. In some implementations, a determination is made as to whether the given media asset matches a user profile. In some implementations, the media asset may be added to the list only if the media asset matches the user profile. In some embodiments, the media asset may be part of a series (e.g., an episode in the series). In such circumstances, the series may be added to the list in addition to (or instead of) adding the media asset to the list.

Popularity for the given media asset in the list may be monitored and/or retrieved after selecting the given media asset for deletion. Popularity of the media asset may be monitored on a real-time basis, on an on-demand basis, and/or periodically. The monitored and/or retrieved popularity of the given media asset, which previously fell below the first threshold, may be compared to a second threshold. In some implementations, the second threshold may be higher or greater than the first threshold. Alternatively, the second threshold may be less than the first threshold or identical to the first threshold. In response to determining that the monitored and/or retrieved popularity of the given media asset, which previously fell below the first threshold, is now above the second threshold, an action relating to re-recording the given media asset is performed.

In some embodiments, the action relating to re-recording the media asset may include generating a notification for the user identifying the media asset for re-recording (e.g., a notification recommending the media asset for re-recording). In some implementations, the notification may include an option for the user to select to schedule the given media asset for recording.

In some embodiments, the action relating to re-recording the media asset may include automatically scheduling to record or automatically recording the media asset. In some embodiments, the action relating to re-recording the media asset may include automatically scheduling to record or automatically recording episodes in a series corresponding to the media asset.

In some embodiments, the given media asset may include an episode of a series. In such circumstances, other episodes in the series may be prevented from being recorded after the given media asset is added to the list of media assets selected for deletion. In addition, previously recorded episodes in the series may be selected for deletion. In some implementations, a determination is made as to whether the user has previously viewed the given media asset (partially or completely). In response to determining that the user has previously viewed the given media asset, other episodes in the series may be identified for recording instead of re-recording the given media asset.

In some embodiments, the given media asset may include an episode of a series. In such circumstances, popularity that is compared with the second threshold may include popularity of the series rather than the individual episode corresponding to the given media asset. The action relating to re-recording the given media asset may be performed in response to determining that popularity of the series meets or exceeds the second threshold. In particular, the given media asset may have been selected for deletion because popularity of the individual episode of the media asset fell below the first threshold. However, the action relating to re-recording the given media asset may be performed in response to determining that popularity of the series meets or exceeds the second threshold independently of the popularity of the individual episode itself.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an illustrative list of previously deleted media assets due to unpopularity of the media assets in accordance with an embodiment of the invention;

DETAILED DESCRIPTION

Figure 1:
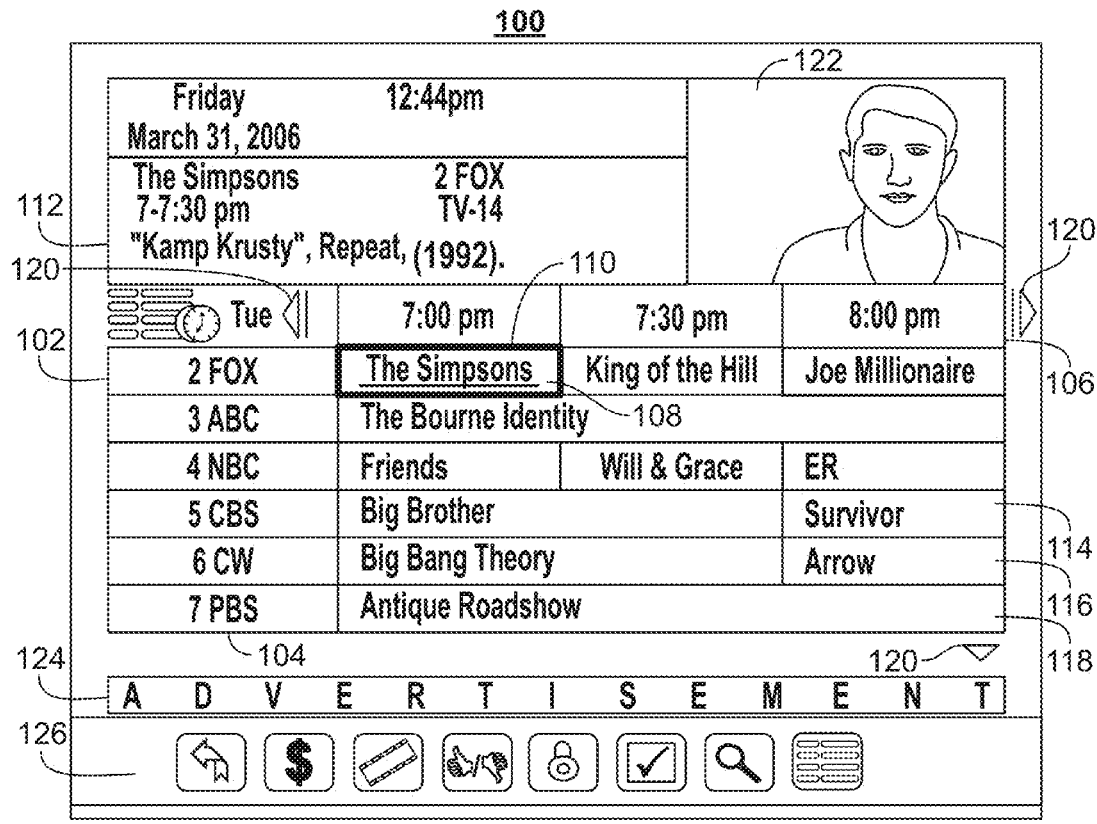
FIGS. 1 and 2 show illustrative display screens that may be used to provide media guidance application listings in accordance with an embodiment of the invention.

In some embodiments, content which was previously deleted because the content was unpopular and is now associated with re-emerged popularity is re-recorded. In particular, a plurality of media assets may be recorded. Responsive to determining that popularity of a given one of the plurality of media assets fell below a first threshold, the given media asset may be selected for deletion. The given media asset may be added to a list of a plurality of media assets that have been selected for deletion. Popularity for the given media asset in the list may be monitored and/or retrieved after selecting the given media asset for deletion. The monitored and/or retrieved popularity of the given media asset, which previously fell below the first threshold, may be compared to a second threshold. In response to determining that the monitored and/or retrieved popularity of the given media asset, which previously fell below the first threshold, is now above the second threshold, an action relating to re-recording the given media asset is performed.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), popularity information, on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
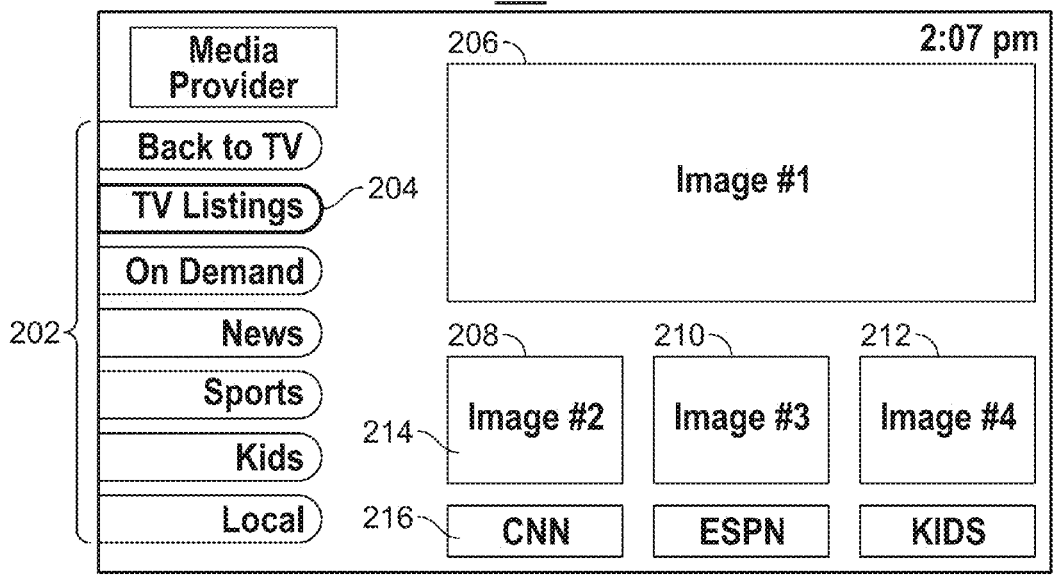
Figure 6:
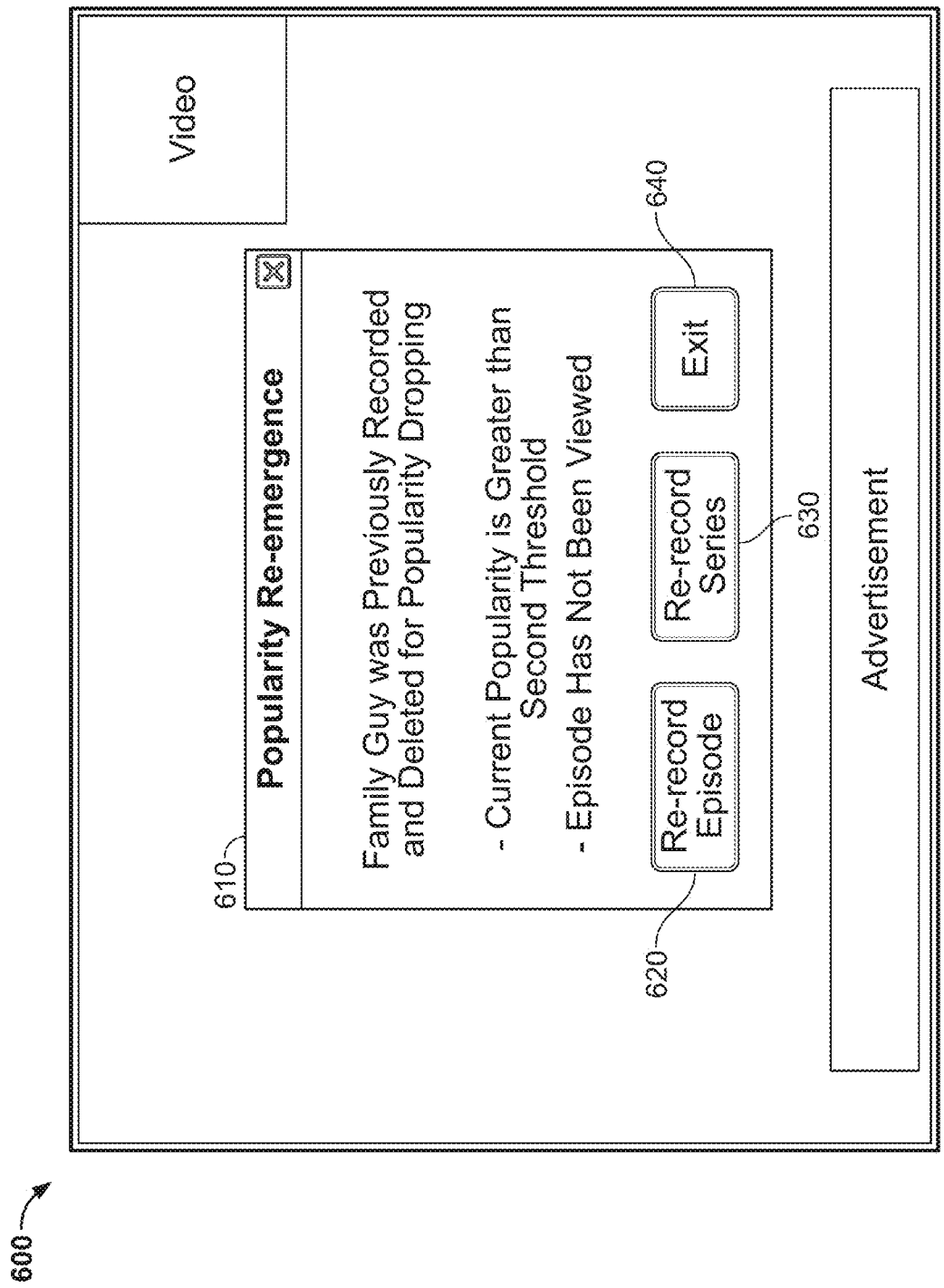
FIG. 6 shows an illustrative display of a screen for notifying a user about a previously unpopular media asset that was deleted then becoming popular in accordance with an embodiment of the invention.

FIGS. 1-2 show illustrative display screens that may be used to provide media guidance data. The display screens shown in FIGS. 1-2 and 6 may be implemented on any suitable user equipment device or platform. While the displays of FIGS. 1-2 and 6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, program's popularity, and other desired information.

Popularity of a media asset may be determined based on popularity information, which may include information on real-time ratings (e.g., how many users are watching these media assets at this time), past ratings (e.g., how many users have previously watched this media asset by either receiving it from media content source 416 or by watching it from another source, such as in a movie theatre), ratings (e.g., a combination of both or either one of real-time ratings and past ratings), posts to an online database, a profile associated with the user, status updates of users on a remote server, microblog entries, industry ratings metrics, number pay-per-view purchases, number of tickets sold in a movie theater, demographic information, psychographic information, rental patterns, regional preferences, user-to-user recommendations, critic scores, user scores, and/or user reactions.

In some embodiments, popularity of a media asset may be weighted based on an attribute of the media asset matching a user profile. For example, a media asset having an attribute that matches a user profile may have the corresponding popularity level increased or weighted more heavily than popularity of a media asset having an attribute that does not match a user profile. For example, if the user profile indicates a user has an interest in comedies but not action types of genres, the media guidance application may weigh popularity of comedy type of media assets more heavily than action or non-comedy type of media assets. In particular, the media guidance application may compute popularity of a given media asset to be 70%. In response to determining that the media asset is associated with an attribute that matches a user profile, the media guidance application may increase the percentage by a predetermined factor (e.g., based on a number of attributes that match the user profile) to 85%. In response to determining that the media asset is associated with an attribute that does not match a user profile, the media guidance application may reduce the percentage by a predetermined factor to 60%. In some implementations, the media guidance application may zero out completely the popularity of a media asset having an attribute that does not match the user profile. In such circumstances, the media guidance application may only perform the process described above and below for, or analyze, popularity of media assets that match a user profile.

Popularity information may be received by media guidance data source 418 and/or user equipment device 300 from the third party server (e.g., a ratings website or other source of information associated with media assets) and/or media guidance data source 418 may collect the popularity information by collecting user interaction information from some or all user equipment devices in system 400 (e.g., the media guidance data source 418 may generate past ratings by collecting user interaction information on how often a particular media asset has been watched by users of system 400 and/or transmitted to user equipment devices in system 400). For example, media guidance data source 418 may receive past ratings from a third-party server (e.g., the media guidance application may download box office results of a media asset from a website), receive user scores from user equipment devices, and use both sets of information to select the media assets.

Popularity information may be received by the media guidance application in real-time, continuously, on an on-demand basis, and/or periodically. In some implementations, the media guidance application may monitor popularity of one or more media assets and retrieve a popularity of the one or more media assets. The media guidance application may monitor popularity continuously, periodically, upon user request, or in any other suitable manner. In some implementations, the media guidance application may be notified by media guidance data source 418 when there is any change in popularity of a given media asset. This may avoid the need for the media guidance application to actively monitor the popularity of each media asset. In response to receiving a notification of the change in popularity, the media guidance application may perform all or part of the process described in connection with FIG. 7.

In addition to, or alternative to, providing access to linear programming (e.g., content that is scheduled to be transmitted to a plurality of user equipment devices at a predetermined time and is provided according to a schedule), from content sources (e.g., television channels or scheduled streaming sources) the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, searching for other users who like unpopular content, or other features. Options available from a main menu display may include search options, VOD options (e.g., fast-access playback operations), parental control options, Internet options, cloud-based options, device synchronization options, options to view recently watched media assets, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog a username and password (e.g., log-in information) may be stored in the user profile information. Control circuitry 304 may utilize this information in the user profile to automatically access the social network or blog to post or transmit information/content/segments/popularity information to or retrieve information/contents/segments/ popularity information from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
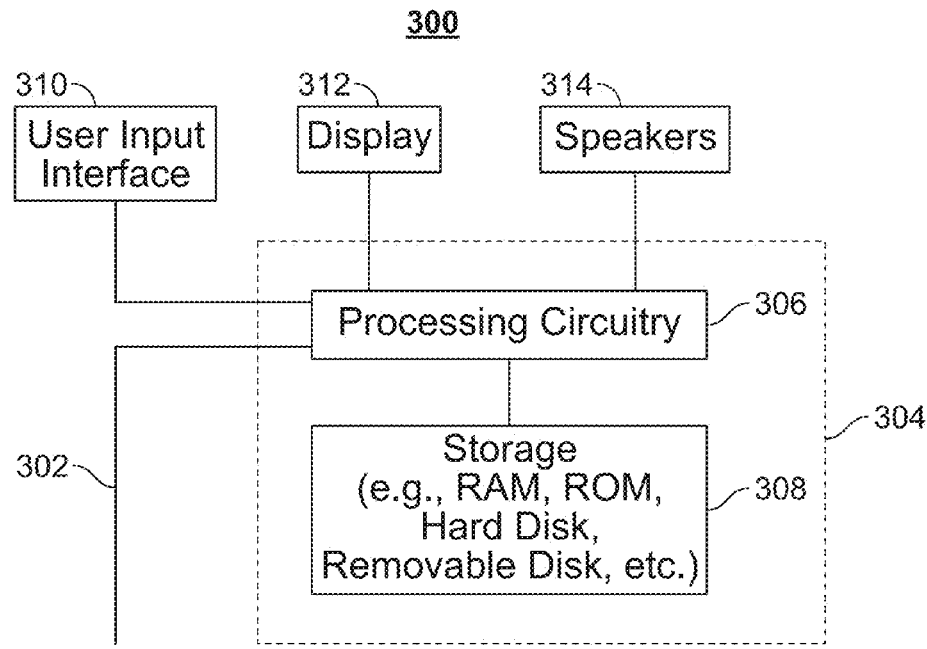
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home), users that are associated with each other on a social network, or any set of users that have ever accessed the media asset. In some implementations, viewing history stored in storage 308 may indicate that a particular user has "viewed" the media asset only after the user has viewed a substantial portion of the media asset (e.g., more than fifty percent of the media asset or more than a threshold amount of the media asset).

In some embodiments, the viewing history may include for each user a time that represents when the user has viewed the media asset. In some implementations, control circuitry 304 may determine two users share interest in a common unpopular media asset when the two users accessed the media asset within a threshold period of time from each other (e.g., within the past week). Control circuitry 304 may determine whether the two users watched the media asset within the threshold period of time from each other based on the time stored in the viewing history that indicates when each user viewed the media asset. In some implementations, the viewing history may be included as part of list of previously deleted programs 500. In some implementations, the viewing history may be stored separate from list of previously deleted programs 500.

In some embodiments, popularity information may be stored in storage 308. The popularity information may be specific to each media asset. In some implementations, the popularity information may be associated with multiple media assets (e.g., the same popularity may be associated with each episode in a series). In some implementations, the popularity information may be associated with each episode in a series (e.g., different popularity may be associated with each episode in a series). In some embodiments, a threshold used to determine whether a media asset is popular or unpopular may be stored in storage 308. The threshold may be automatically set or assigned by the user. In some embodiments, a list of friends of the user may be stored in storage 308. In some embodiments, a list of users who access each media asset may be stored in storage 308. In some implementations, the popularity information may be included as part of list of previously deleted programs 500. In some implementations, the popularity information may be stored separate from list of previously deleted programs 500.

In some embodiments, list of previously deleted programs 500 may be stored in storage 308. List 500 may be stored as a database. For example, list 500 may be included as part of a popularity threshold database. List 500 may be stored locally or remotely on a remote server. List 500 may identify each media asset that was previously recorded and subsequently deleted by the media guidance application. In some implementations, list 500 may only include those media assets that were automatically deleted (e.g., because the media guidance application determined that their corresponding popularity fell below a given threshold). In some implementations, list 500 may only include those media assets that were deleted manually by the user or upon user request. In some implementations, list 500 may include media assets that were automatically deleted and deleted manually by the user or upon user request.

In some embodiments, the media guidance application may monitor popularity of media assets that are currently being recorded (locally or remotely) and media assets that have been recorded. The media guidance application may retrieve the popularity of a given one of the media assets and a first threshold corresponding to the given media asset. As referred to herein, the phrase "first threshold" refers to a value identifying a popularity level that indicates whether a media asset is popular or unpopular and is used by the media guidance application to determine whether or not to delete the media asset from storage 308. In particular, a popularity that is above the first threshold may indicate that the corresponding media asset is popular whereas a popularity that is below the first threshold may indicate that the corresponding media asset is unpopular.

In some implementations, different media assets or groups of media assets (e.g., media assets associated with a given characteristic, such as a genre or category) may be associated with different first thresholds. For example, comedy type of media assets may be associated with a lower first threshold than action type of media assets. Accordingly, a media asset that is associated with a comedy genre having an identical popularity value as another media asset, associated with an action genre, may be determined to be popular (e.g., because the popularity exceeds the first threshold) while the another media asset may be determined to be unpopular. In some implementations, the first threshold may be the same across all media assets.

In some embodiments, the media guidance application may compare the retrieved popularity of the given media asset to the associated first threshold. In response to determining that the popularity of the given media asset is below the first threshold (e.g., the popularity has fallen to the point of the media asset being unpopular), the media guidance application may select the media asset for deletion from storage 308. In the case of the given media asset being currently recorded, the media guidance application may stop recording the media asset (mid-way through the recording) in response to determining that the popularity of the given media asset is below the first threshold (e.g., the popularity has fallen to the point of the media asset being unpopular). As referred to herein, the phrase "select for deletion" or "select for delete" or the like should be understood to mean remove the corresponding data or media asset from storage immediately or in the future. In the case of removing the data or media asset in the future, the corresponding data or media asset is tagged for deletion. When space needs to be freed up from storage 308, then the data or media asset that has been tagged for deletion is removed. In particular, a media asset "selected for deletion" may be removed from storage only when space is needed (making the media asset available until storage space is needed in the future) or may be removed from storage right away (making the media asset immediately unavailable to the user).

In some embodiments, the media guidance application may add the given media asset to list 500 stored in storage 308. In particular, the media guidance application may store or add an entry to list 500 corresponding to the given media asset that was deleted. The media guidance application may add the entry for the given media asset to list 500 in response to determining that the popularity of the given media asset is below the first threshold and/or in response to deleting the given media asset based on the popularity of the given media asset falling below a threshold. In some embodiments, the media guidance application may only add media assets that match a user profile attribute to list 500.

In some implementations, the media guidance application may notify a user that the given media asset was automatically deleted and the reason for the automatic deletion (e.g., because popularity of the media asset has fallen below the first threshold). In some implementations, the user may override the decision to automatically delete the given media asset by responding to the notification. In particular, the media guidance application may include an option in the notification allowing the user to instruct the media guidance application not to delete the given media asset despite the drop in popularity. In response to receiving a user selection of the option, the media guidance application may prevent deletion of the given media asset even though the popularity of the media asset has fallen below the first threshold.

In some embodiments, in response to determining that the popularity of the given media asset is below the first threshold (e.g., the popularity has fallen to the point of the media asset being unpopular), the media guidance application may determine whether the media asset is an episode in a series. In response to determining that the media asset is an episode in the series, the media guidance application may automatically delete the media asset from storage 308 in addition to every other episode in the series (e.g., every episode in the same season as the media asset in the series and/or every episode from past and current seasons of the series). The media guidance application may un-schedule from recording all future episodes of the series of the media asset in response to determining that the popularity of the given media asset is below the first threshold (e.g., the popularity has fallen to the point of the media asset being unpopular) and that the media asset is part of a series.

In some embodiments, when the media asset is part of a series, the media guidance application may add the series of the given media asset to list 500 stored in storage 308. In particular, the media guidance application may store or add an entry to list 500 corresponding to the series of the given media asset that was deleted or un-scheduled from recording. The media guidance application may add the entry for the given media-asset series to list 500 in response to determining that the popularity of the given media asset is below the first threshold and/or in response to deleting the given media-asset series based on the popularity of the given media asset falling below a threshold. In some implementations, the media guidance application may notify a user that the given media-asset series was automatically deleted and the reason for the automatic deletion (e.g., because popularity of the media asset has fallen below the first threshold). In some implementations, the user may override the decision to automatically delete the given media-asset series by responding to the notification. In particular, the media guidance application may include an option in the notification allowing the user to instruct the media guidance application not to delete the given media-asset series despite the drop in popularity. In response to receiving a user selection of the option, the media guidance application may prevent deletion of the given media-asset series and keep future episodes of the series in the scheduled recordings list even though the popularity of the given media asset has fallen below the first threshold.

In some embodiments, list 500 may include multiple fields for each entry 570. For example, list 500 may include, for each media asset entry, a title field 510, a current popularity field 520, a first popularity threshold field 530, and a second popularity threshold field 540. Title field 510 may include a unique identifier (e.g., a title or code) of the media asset or series of the media asset. Current popularity field 520 may include a value identifying a current popularity of the media asset. In some implementations, the media guidance application may update the value stored in current popularity field 520 in response to monitoring popularity of the media asset. Specifically, the media guidance application may update the value of the popularity in field 520 with a popularity value for the media asset retrieved based on the popularity monitoring. First threshold field 530 may identify the value of the first threshold associated with the media asset.

Second threshold field 540 may identify a threshold value that indicates when a media asset previously determined to be unpopular becomes popular again. In some implementations, second threshold field 540 may be the same or include the same value as first threshold field 530. In some implementations, second threshold field 540 may be greater than or less than the value in first threshold field 530. As referred to herein, the phrase "second threshold" refers to a value identifying a popularity level that indicates whether a media asset, previously determined to be unpopular, is now popular and is used by the media guidance application to determine whether or not to re-record the media asset in storage 308. In some embodiments, the second threshold value is associated with re-emergence of popularity of a given media asset. In particular, a popularity that is above the second threshold may indicate that the corresponding media asset has become popular again whereas a popularity that is below the second threshold may indicate that the corresponding media asset is still unpopular.

In some embodiments, the second threshold may be greater than the first threshold. In such circumstances, a media asset has to be more popular than the media asset was before being automatically deleted in order to be re-recorded. As such, even though a media asset may have regained popularity to the level that would have prevented the media guidance application from automatically deleting the media asset, the media asset may still not be automatically re-recorded if it has not surpassed that level to reach the second threshold value. This may ensure that a media asset has to be really popular in order to be re-recorded automatically.

In some embodiments, the second threshold may be less than the first threshold. In such circumstances, a media asset has to be less popular than the media asset was before being automatically deleted in order to be re-recorded. As such, even though a media asset may have been deleted based on a popularity falling to a first threshold, the media asset may be automatically re-recorded if it has a popularity that has risen to a level that is under the first threshold value.

In some embodiments, the media guidance application may present list of previously deleted programs 500 to the user. In such circumstances, the value of the first and second thresholds may independently be set or adjusted by a user. In particular, the user may set by how much more a popularity of a media asset needs to be greater than the previous popularity before being recommended for re-recording. In particular, in response to receiving a user selection of an set option 542, the media guidance application may request input from the user indicating a new value for the second threshold. The media guidance application may update a value stored in second threshold field 540 based on the input received from the user.

In some embodiments, the media guidance application may compare a newly retrieved value (e.g., an updated value stored in currently popularity field 520) for a given media asset with the value stored in second threshold field 540. The media guidance application may perform this comparison in response to receiving updated popularity information for a given media asset. In response to determining that the current popularity stored in field 520 meets or exceeds the value stored in second threshold field 540, the media guidance application may perform an action relating to re-recording the given media asset. In some embodiments, the action performed may include automatically re-recording the given media asset, generating a notification requesting user input to re-record the media asset, generating a notification indicating that the given media asset has been automatically selected for recording, automatically re-recording other episodes in the series corresponding to the given media asset, and/or any combination thereof.

For example, the action performed by the media guidance application may include automatically re-recording the media asset that was previously automatically or manually deleted. For example, the media guidance application may determine that entry 550 for the media asset "Family Guy" has a current popularity level of 88% which exceeds the 86% second threshold stored in field 540. In some embodiments, before re-recording the media asset, the media guidance application may generate a notification, as part of the action performed, for the user indicating that a media asset for which popularity previously fell to the point of becoming unpopular has now become popular again. The media guidance application may generate the notification for display in response to determining that the current popularity stored in field 520 meets or exceeds the value stored in second threshold field 540. An exemplary notification is discussed in connection with FIG. 6 below.

In some embodiments, the media guidance application may determine whether the media asset for which the popularity meets or exceeds the value stored in second threshold field 540 has been viewed (fully or partially) before automatically re-recording the media asset and/or generating the notification for the user. In response to determining that the media asset has been viewed, the media guidance application may not re-record the media asset even though the popularity of the media asset has re-emerged. For example, if the media asset "Family Guy" has been viewed, the media guidance application may prevent re-recording the media asset even though the popularity of the media asset has re-emerged (e.g., the popularity exceeds the second threshold). Specifically, the user may not be interested in seeing the media asset again even though the popularity re-emerged and so the media guidance application may not re-record the media asset. The user may have seen the media asset using the recording of the media asset before the media asset was deleted. Alternatively, the user may have seen the media asset through another source (e.g., online) after the media asset was deleted because of the drop in popularity.

In some embodiments, the media guidance application may determine whether the media asset for which the popularity meets or exceeds the value stored in second threshold field 540 is an episode in a series before automatically re-recording the media asset and/or generating the notification for the user. In response to determining that the media asset is an episode in a series, the media guidance application may re-schedule for recording or re-record automatically any viewed or unviewed episode of the same series in addition to the media asset.

In some embodiments, the media guidance application may determine whether the series associated with an entry in list 500 is associated with a popularity that meets or exceeds the value stored in second threshold field 540. In such circumstances, in response to determining that the popularity of the series (rather than an individual episode of the series) meets or exceeds the value stored in second threshold field 540, the media guidance application may re-schedule for recording or re-record automatically any viewed or unviewed episode of the series. In some embodiments, the media guidance application may only record all the episodes in the current season of the series (e.g., the season of the series for which the popularity exceeds the second threshold) rather than all of the prior and future episodes of the series.

As referred to herein, the term "record" should be understood to mean store on a persistent storage device. Media assets may be recorded either by accessing a linear version of the media asset from a broadcast source and scheduling the media assets for recording when they are broadcast. Alternatively, media assets may be recorded by accessing an online version of the media assets (e.g., a non-linear version of the media assets) from an on-demand source and downloading a copy of the online version to a local or remote storage device.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify who the user is who provided the verbal input. Based on this identification, control circuitry 304 may retrieve from storage 308 the corresponding authorization level of the user.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes in physiological and/or physical attributes (or interest) of a user at or during specified sections of a media content being presented. Upon detecting a change in the biometric response of the user (e.g., indicating change in interest), control circuitry 304 may utilize a biometric response database to identify who the user associated with the biometric response.

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-topeer communication of user equipment devices, or communication of user equipment devices in locations remote from each other (described in more detail below).

Memory may be an electronic storage device provided as storage 308 that is part of control circuitry 304. As referred to herein, the phrase "electronic storage device," "storage circuitry," or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to access a last content source. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
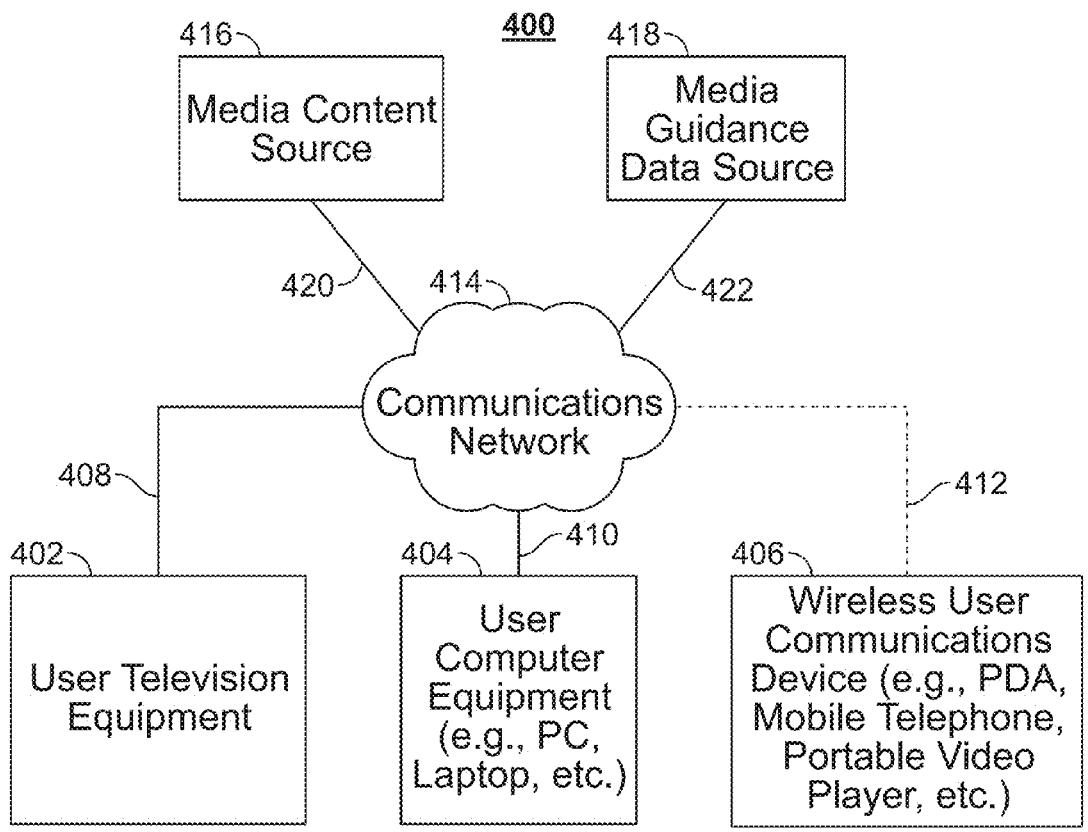
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device (e.g., remote from the first device).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may generate the notification for display in response to determining that the current popularity value stored in field 520 (FIG. 5) of a given entry meets or exceeds the value stored in second threshold field 540 for that entry. For example, the media guidance application may have deleted the media asset "Family Guy" because the previous popularity fell below the value specified in first threshold field 530. An entry 550 for the media asset may have been added in response to list 500. After monitoring the popularity of the media asset, the media guidance application may determine that the current popularity of the media asset "Family Guy" meets or exceeds the value stored in second threshold field 540. In response, the media guidance application may notify the user that the media asset "Family Guy" is associated with a popularity that has re-emerged.

FIG. 6 shows an illustrative display of a screen 600 for notifying a user about a previous unpopular program that was deleted becoming popular in accordance with an embodiment of the invention. In particular, screen 600 shows an illustrative notification 610 presented to a user identifying a media asset associated with a popularity that has re-emerged.

Notification 610 may be provided to the user on a second screen device, as an overlay on a main screen, or in a separate menu (e.g., a menu listing all notifications relating to media assets that are associated with a popularity that has re-emerged). Notification 610 may include a re-record episode/media asset option 620, re-record series option 630, and exit option 640. Notification 610 may include information identifying the media asset, media-asset series, and/or indication of why the media asset is being recommended for re-recording. For example, notification 610 may correspond to entry 550 (FIG. 5) and may include the title "Family Guy" of the media asset specified in field 510. Notification 610 may state that the media asset was previously recorded and deleted because the corresponding popularity dropped below the first threshold (e.g., the value specified in first threshold field 530). Notification 610 may include an indication of the current popularity of the media asset (e.g., the value of current popularity field 520) and an indication that the current popularity meets or exceeds the second threshold (e.g., the value specified in second threshold field 540). Notification 610 may also identify for the user whether the media asset was viewed by the user (completely or partially).

In response to receiving a user selection of exit option 640, the media guidance application may remove notification 610 from display and return the user to a previous screen. In some implementations, in response to receiving a user selection of exit option 640, the media guidance application may perform a default operation regarding the re-emerged media asset. The default operation may include any combination of automatically re-record the media asset, automatically re-record the series of the media asset, and/or prevent re-recording the media asset.

In some embodiments, in response to receiving a user selection of option 620, the media guidance application may record or schedule to record the media asset identified in notification 610. In some embodiments, after re-recording the media asset, a media asset listing for the recorded media asset may be visually distinguished from media asset listings for other recorded media assets. For example, the media guidance application may include a visual indicator (e.g., an icon or a background of a specified color) with/for a media asset listing for the re-recorded media asset. The indicator may inform the user that the media asset was previously recorded, then deleted because of a drop in popularity, and then re-recorded because the corresponding popularity re-emerged. This visual indicator may be displayed when the media asset listing for the re-recorded media asset is displayed concurrently with media asset listings for media asset recorded or scheduled for recording for the first time.

In some embodiments, in response to receiving a user selection of option 630, the media guidance application may record or schedule to record the series corresponding to the media asset identified in notification 610. For example, the media guidance application may record or schedule to record every episode in the series corresponding to the identified media asset. In some embodiments, the media guidance application may only record or schedule to record unviewed episodes of the series. In some embodiments, the media guidance application may record or schedule to record viewed and unviewed episodes of the series. In some embodiments, the media guidance application may record or schedule to record episodes in the series corresponding to the media asset that are in the same season as the media asset identified in notification 610. In some embodiments, the media guidance application may record or schedule to record episodes in the series corresponding to the media asset that are in previous and future seasons of the series. In some embodiments, the media guidance application may record or schedule to record only episodes of the series that follow the episodes of the media asset in the sequence of episodes of the series.

Media assets that are scheduled to be re-recorded because of a re-emerged popularity may be recorded by the media guidance application locally or remotely (e.g., on cloud-based storage) using storage 308. In the case of cloud-based storage, the media guidance application may transmit an instruction to a remote server that includes an identification of the media asset (e.g., a title or unique number) and a recording time. The remote server may use resources similar to equipment 300 (e.g., storage 308 and tuning circuitry) to record the identified media asset at the recording time specified. The remote server may make the recorded media asset available to the user to access after the remote server records the media asset. In some circumstances, the media asset may initially have been recorded locally on storage 308 of user equipment 300 and then automatically deleted (e.g., because the media asset was determined to be unpopular). In some implementations, even though the media asset was stored locally on user equipment 300, the media guidance application may re-record the media asset on a remote server instead of locally when the media guidance application determines that popularity of the media asset has re-emerged.

Figure 7:
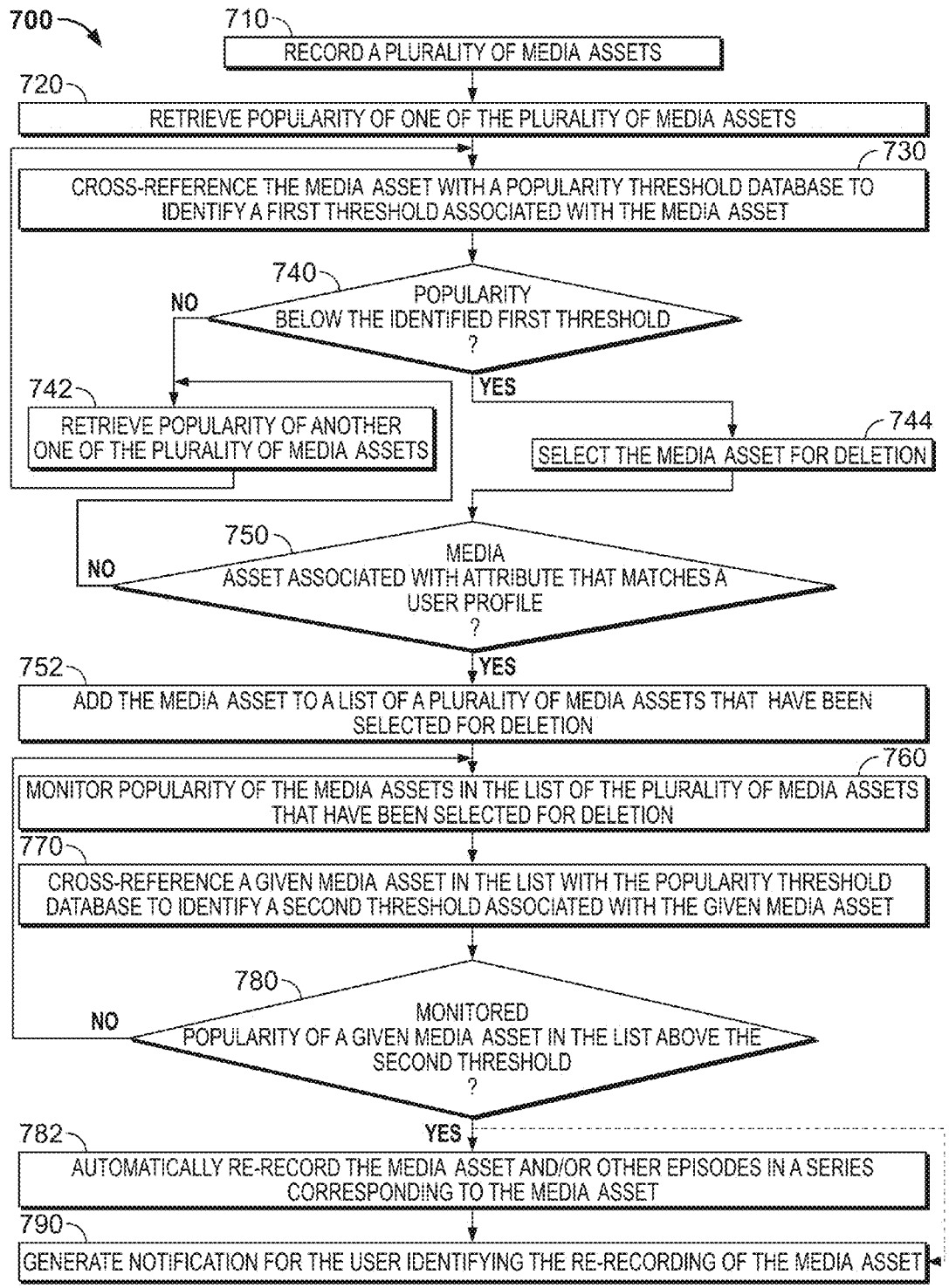
FIG. 7 shows an illustrative flow diagram of a process for re-recording content associated with re-emerged popularity in accordance with an embodiment of the invention.

FIG. 7 shows an illustrative flow diagram of a process 700 for re-recording content associated with popularity that has re-emerged in accordance with an embodiment of the invention. At step 710, a plurality of media assets may be recorded. For example, the media guidance application may automatically record media assets that are popular, manually selected media assets, media assets that match a user profile, or any combination thereof. The recorded media assets may be stored on storage 308.

At step 720, popularity of one of the plurality of recorded media assets is retrieved. For example, the media guidance application may retrieve from a remote server popularity of a given media asset. In particular, the media guidance application may retrieve an identifier of one of the recorded media assets. The media guidance application may retrieve and/or determine popularity of the given media asset from an online database, a profile associated with the user, status updates of users on a remote server, microblog entries, industry ratings metrics, number pay-per-view purchases, number of tickets sold in a movie theater, demographic information, psychographic information, rental patterns, regional preferences, and/or user-to-user recommendations. In some implementations, the media guidance application may retrieve the popularity based on the current popularity specified in field 520 of list 500 (FIG. 5) for the media asset.

At step 730, the media asset may be cross-referenced with a popularity threshold database to identify a first threshold associated with the media asset. For example, the media guidance application may generate an SQL query that includes an identifier of the media asset and send the query to a database that includes list 500 to retrieve the value stored in first threshold field 530 (FIG. 5).

At step 740, a determination is made as to whether the popularity is below the identified first threshold. In response to determining that the popularity is below the first threshold, the process proceeds to step 744, otherwise the process proceeds to step 742.

At step 742, popularity of another one of the plurality of recorded media assets is retrieved. For example, the media guidance application may retrieve from a remote server popularity of another recorded media asset. In particular, the media guidance application may retrieve an identifier of another one of the recorded media assets. The media guidance application may retrieve and/or determine popularity of the given media asset from an online database, a profile associated with the user, status updates of users on a remote server, microblog entries, industry ratings metrics, number pay-per-view purchases, number of tickets sold in a movie theater, demographic information, psychographic information, rental patterns, regional preferences, and/or user-to-user recommendations. In some implementations, the media guidance application may retrieve the popularity based on the current popularity specified in field 520 of list 500 (FIG. 5) for the media asset.

At step 744, the recorded media asset may be selected for deletion. For example, the media guidance application may mark the recorded media asset for deletion (e.g., removal from storage 308). Marked recorded media assets may be removed from storage 308 in a given order (e.g., oldest recorded first, lowest popularity first, most recently recorded first, or according to priorities assigned automatically or by the user) when space is needed. Alternatively, the media guidance application may remove the recorded media asset from storage 308 immediately.

At step 750, a determination is made as to whether the media asset is associated with an attribute that matches a user profile. In response to determining that the media asset attribute matches the user profile, the process proceeds to step 752, otherwise the process proceeds to step 742. For example, the media guidance application may retrieve one or more attributes of the media asset from media guidance data associated with the media asset (e.g., a genre, such as comedy). The media guidance application may retrieve a profile of the user and attributes of the user profile. The media guidance application may determine whether the user has a preference for the one or more attributes of the media asset based on the user profile.

At step 752, the media asset is added to a list of a plurality of media assets that have been selected for deletion. For example, the media guidance application may add an entry corresponding to the media asset to list 500 (FIG. 5). Alternatively or in addition, the media guidance application may add an entry identifying the series in which the media asset is in to list 500.

At step 760, popularity of the media assets in the list of the plurality of media assets that have been selected for deletion may be monitored. For example, the media guidance application may receive updated popularities for media assets in the list on a real-time basis, on an on-demand basis, and/or periodically.

At step 770, a given media asset in the list is cross-referenced with the popularity threshold database to identify a second threshold associated with the given media asset. For example, the media guidance application may generate an SQL query that includes an identifier of the given media asset and send the query to a database that includes list 500 to retrieve the value stored in second threshold field 540 (FIG. 5).

At step 780, a determination is made as to whether the monitored popularity of the given media asset in the list is above the second threshold. In response to determining that the popularity is above the second threshold, the process proceeds to step 782 (or optionally 790, as shown by the dotted line), otherwise the process proceeds to step 760. For example, in response to determining that the popularity is above the second threshold, the media guidance application may perform an action relating to re-recording the given media asset (e.g., an action relating to re-emergence of the popularity of the media asset).

At step 782, the media asset and/or other episodes in a series corresponding to the media asset is re-recorded automatically. For example, the media guidance application may schedule for recording the media assets and/or other episodes in the series of the media asset. In some implementations, the media guidance application may only schedule for recording or record those media assets or episodes that the user has not yet viewed. In some implementations, the media guidance application may only schedule for recording or record those media assets or episodes that the user has not yet viewed as well as those that have been viewed.

At step 790, a notification is generated for the user identifying the re-recording of the media asset. For example, the media guidance application may generate notification 610 for presentation to the user (FIG. 6). Notification 610 may include re-record episode/media asset option 620, re-record series option 630, and exit option 640. Notification 610 may state that the media asset was previously recorded and deleted because the corresponding popularity dropped below the first threshold (e.g., the value specified in first threshold field 530). Notification 610 may include an indication of the current popularity of the media asset (e.g., the value of current popularity field 520) and an indication that the current popularity meets or exceeds the second threshold (e.g., the value specified in second threshold field 540). Notification 610 may also identify for the user whether the media asset was viewed by the user (completely or partially).

It should be understood that the above steps of the flow diagram of FIG. 7 may be executed or performed in any order or sequence not limited to the order and sequence shown and described in the figure. Some of the steps of the flow diagram of FIG. 7 may be omitted or skipped. Also, some of the above steps of the flow diagram of FIG. 7 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for re-recording content associated with popularity that has re-emerged, the method comprising:
    storing a plurality of media assets;

determining, at a first time, whether popularity of a media asset of the plurality of media assets is below a first threshold;

in response to determining that the popularity of the media asset is below the first threshold, deleting the given media asset;

determining, at a second time after the first time, whether the popularity of the deleted media asset is above a second threshold; and in response to determining that the popularity of the deleted media asset is above the second threshold, storing the deleted media asset again.

2. The method of claim 1, further comprising:

in response to determining that the popularity of the deleted media asset is above the second threshold, generating for display a notification comprising at least one of an indication of the media asset and an option associated with the media asset; and in response to receiving no user input associated with the notification, performing a predetermined default action associated with the media asset.

3. The method of claim 1, further comprising receiving the popularity of the deleted media asset on a real-time basis, on an on-demand basis, or periodically.

4. The method of claim 1, wherein the plurality of media assets is a first plurality of media assets, and further comprising, in response to determining that the popularity of the deleted media asset is above the second threshold, storing a second plurality of media assets associated with the media asset.

5. The method of claim 4, further comprising identifying the second plurality of media assets by identifying unviewed episodes of a series of episodes associated with the media asset.

6. The method of claim 4, further comprising identifying the second plurality of media assets by identifying episodes in a season associated with the media asset.

7. The method of claim 4, further comprising identifying the second plurality of media assets by identifying episodes that follow the media asset in a series of episodes associated with the media asset.

8. The method of claim 1, further comprising:

retrieving a user profile comprising a plurality of preferences;

retrieving an attribute of the deleted media asset; and determining whether a preference of the plurality of preferences in the user profile matches the attribute of the deleted media asset.

9. The method of claim 1, wherein storing the plurality of media assets comprises storing the plurality of media assets at a first storage location, and wherein storing the deleted media asset again comprises storing the deleted media asset at a second storage location.

10. The method of claim 1, wherein the plurality of media assets is a first plurality of media assets, and wherein deleting the media asset further comprises:

marking the media asset for deletion, wherein the media asset is one of a second plurality of media assets marked for deletion;

determining that more storage space for storing the first plurality of media assets is needed;

removing media assets of the second plurality of media assets in an order based on at least one of recording dates, popularities, or priorities associated with each of the second plurality of media assets.

11. A system for re-recording content associated with popularity that has re-emerged, the system comprising:

a storage device configured to store a plurality of media assets;

control circuitry configured to:

determine, at a first time, whether popularity of a media asset of the plurality of media assets is below a first threshold;

in response to determining that the popularity of the media asset is below the first threshold, delete the given media asset;

determine, at a second time after the first time, whether the popularity of the deleted media asset is above a second threshold; and in response to determining that the popularity of the deleted media asset is above the second threshold, store the deleted media asset again.

12. The system of claim 11, wherein the control circuitry is further configured to:

in response to determining that the popularity of the deleted media asset is above the second threshold, generate for display a notification comprising at least one of an indication of the media asset and an option associated with the media asset; and in response to receiving no user input associated with the notification, perform a predetermined default action associated with the media asset.

13. The system of claim 11, wherein the control circuitry is further configured to receive, using communications circuitry, the popularity of the deleted media asset on a real-time basis, on an on-demand basis, or periodically.

14. The system of claim 11, wherein the plurality of media assets is a first plurality of media assets, and wherein the control circuitry is further configured to, in response to determining that the popularity of the deleted media asset is above the second threshold, store a second plurality of media assets associated with the media asset.

15. The system of claim 14, wherein the control circuitry is further configured to identify the second plurality of media assets by being configured to identify unviewed episodes of a series of episodes associated with the media asset.

16. The system of claim 14, wherein the control circuitry is further configured to identify the second plurality of media assets by being configured to identify episodes in a season associated with the media asset.

17. The system of claim 14, wherein the control circuitry is further configured to identify the second plurality of media assets by being configured to identify episodes that follow the media asset in a series of episodes associated with the media asset.

18. The system of claim 11, wherein the control circuitry is further configured to:

retrieve a user profile comprising a plurality of preferences;

retrieve an attribute of the deleted media asset; and determine whether a preference of the plurality of preferences in the user profile matches the attribute of the deleted media asset.

19. The system of claim 11, wherein the storage device is a first storage device, and further comprising a second storage device configured to store the deleted media asset again.

20. The system of claim 11, wherein the plurality of media assets is a first plurality of media assets, and wherein the control circuitry configured to delete the media asset is further configured to:

mark the media asset for deletion, wherein the media asset is one of a second plurality of media assets marked for deletion;
determine that more storage space for storing the first plurality of media assets is needed;
remove media assets of the second plurality of media assets in an order based on at least one of recording dates, popularities, or priorities associated with each of the second plurality of media assets.

* * * * *